United States Patent [19]

van de Weerd

[11] 4,174,718

[45] Nov. 20, 1979

[54] RUB-THRESHING MACHINE

[75] Inventor: Berend van de Weerd, Bennekom, Netherlands

[73] Assignee: Ter Borg & Mensinga's Machinefabriek N.V., Appingedam, Netherlands

[21] Appl. No.: 852,485

[22] Filed: Nov. 17, 1977

[30] Foreign Application Priority Data

Nov. 25, 1976 [NL] Netherlands .................... 7613173

[51] Int. Cl.² .......................................... A01F 12/18
[52] U.S. Cl. ................................................ 130/30 J
[58] Field of Search ............... 130/30 J, 30 D, 30 C

[56] References Cited

U.S. PATENT DOCUMENTS

| | | | |
|---|---|---|---|
| 260,494 | 7/1882 | Meyer | 130/30 J |
| 1,042,859 | 10/1912 | Whitmore | 130/30 J |
| 1,241,028 | 9/1917 | Sanford | 130/30 J |
| 1,307,322 | 6/1919 | St. Clair | 130/30 J |

*Primary Examiner*—Jay N. Eskovitz
*Attorney, Agent, or Firm*—Eyre, Mann, Lucas & Just

[57] ABSTRACT

Rub-threshing machine for threshing grains and pulse comprising at least two endless belts which have been passed around guiding- and driving rollers, are driven at different speeds and are in mutual contact over a part of their surface length so as to thresh material at that location which is supplied to the belts. At least the lower threshing belt and preferably also the top threshing belt, is constructed of rod shaped elements, transverse with respect to the belt's direction of travel, and interconnected at their ends in such manner that the rods obtain a mutual spacing which is selected, for each sort of crop to be processed such, that the fruit can fall through the rods.

12 Claims, 1 Drawing Figure

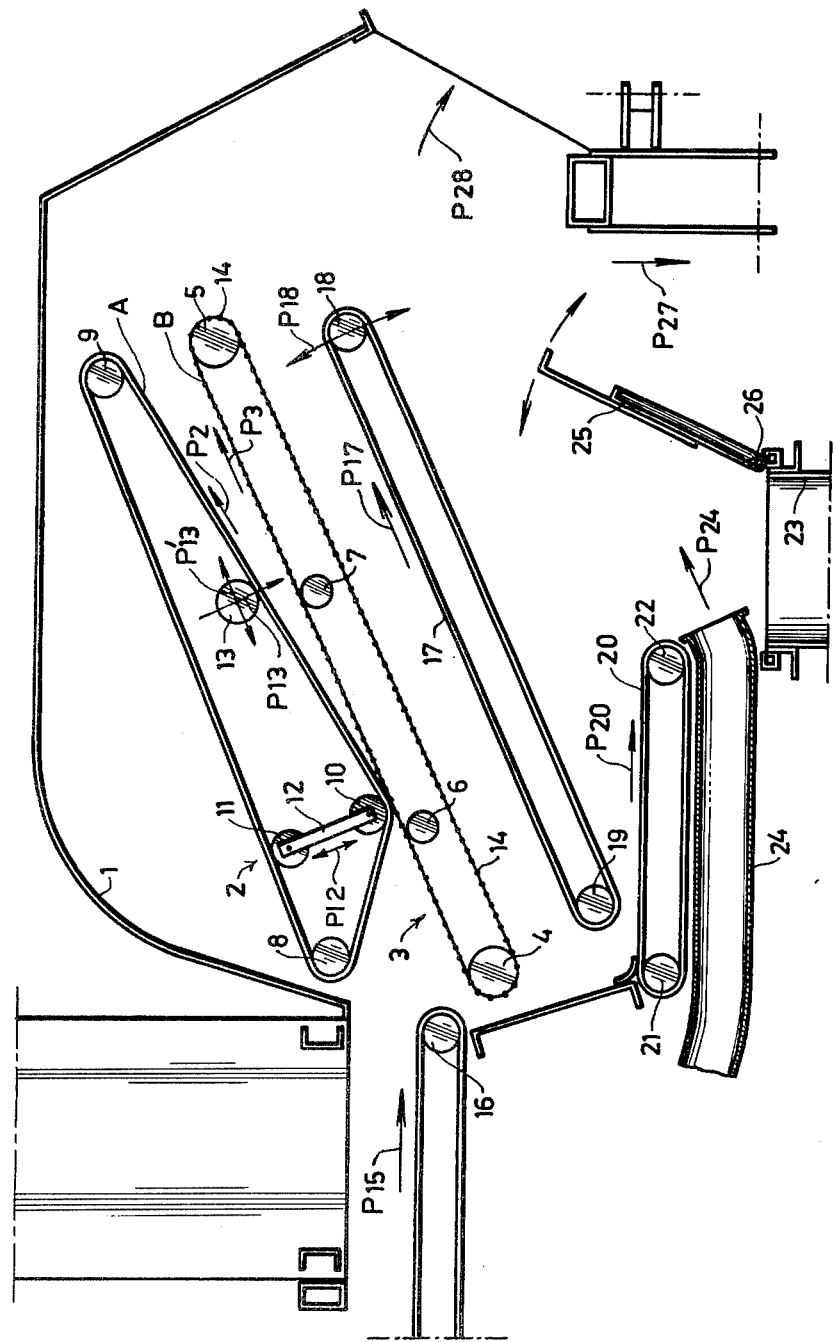

RUB-THRESHING MACHINE

BACKGROUND OF THE INVENTION

The invention relates to a threshing machine for threshing grains and pulse, which utilizes the rubbing action produced by at least two endless belts.

SHORT DESCRIPTION OF THE PRIOR ART

Rub-threshing has successfully been done in a machine in which the threshing belts comprise two endless rubber belts, which are driven at different speeds and are in mutual contact or at so close a distance over a part of their surface length that material supplied to the belts is threshed. At the output end a sieve section has been added in order to separate the fruit and the offal material from each other.

THE OBJECTS OF THE INVENTION

The principal object of this invention is to increase the threshing capacity. Another object is to simplify the machine structure, more particularly by making the separate sieve section redundant.

SUMMARY OF THE INVENTION

According to the basic idea of the present invention at least a bottom threshing belt is constructed of rod shaped elements, transverse with respect to the belt's direction of travel, and interconnected at their ends in such manner that the rods obtain a mutual spacing which is selected, for each sort of crop to be processed, such that the fruit can fall through the rods.

Surprisingly it has turned out that in this way the threshing capacity is increased, i.e. the amount of material which can be threshed for otherwise the same parameters like belt speeds, belt widths, length of rubbing contact between the two belts etc. Moreover in this way a separate sieving section behind the threshing section has become redundant, so that the structure of the machine in its entirety has been simplified.

In order to improve the rubbing action in a preferred embodiment also the top threshing belt comprises a similar rod belt.

In view of an efficient separation of fruit and offal material in a further favourable embodiment of the invention a closed belt is positioned below the threshing belts for discharging the material falling through the lower rod belt.

The invention will hereinafter be clarified with reference to the accompanying drawing.

SURVEY OF THE DRAWING

In the drawing the single FIGURE schematically represents the general structure of the rub-threshing machine of the invention, contemplated as a vertical sectional view, and realised with two threshing belts.

DESCRIPTION OF A PREFERRED EMBODIMENT

In a housing, the cap of which is indicated by 1, threshing is effected by means of two threshing belts 2 and 3, respectively. Either one of these belts, in this embodiment, is an endless belt. The bottom belt 3 is passed over two end rollers 4,5, and in between these end rollers there are two support rollers 6,7 such, that the upper half of belt 3 is given a substantially straight course. At least one of rollers 4 to 7 incl. is driven, in such a manner that the belt travels in the direction of the arrow P3. Belt 3 in its entirety has an inclined position, i.e. the general direction from roller 4 to roller 5 makes an angle of for example between 10° and 40° with respect to the horizontal plane, the upper half of the loop therefore travelling upwardly.

The loop-shaped upper belt or top belt 2 is passed over two extreme or end rollers 8,9, one of which again is a driving roller. The loop is kept open by a pair of guide rollers 10 and 11, respectively, which may be provided at the extremities of a common carrier 12. This unit is movable up and down in the direction of arrow P12, so substantially perpendicular to the face of the top surface of the bottom belt 3, a spring (not represented) securing in a known way for the lower half of the loop of belt 2 to be urged substantially against the upper half of the loop of belt 3. It is visible that roller 10 is at rather short spacing from the guide roller 6 for the bottom belt. Further toward the end roller 9 and not too far from guide roller 7, another guide roller 13 for the top belt 2 has been provided. This one again is urged by spring action in the direction of arrow P13 against bottom belt 3, but moreover, it is adjustable in the direction parallel to the belt surface, as indicated by the double arrow P'13. With this the length of the contact area of the two belts 2,3 which is determined by the spacing of the top belt's guide rollers 10 and 13, can be adjusted in order to influence the threshing process dependent on the material to be threshed. The top belt is driven in the sense of arrow P2, so the lower half running in the same direction as the top half of the bottom belt, but with different speeds.

The lower threshing belt 3 is constructed of a plurality of rods such as schematically indicated by 14 arranged transverse the direction of belt travel. These rods can be kept together at their ends in a manner which is of no importance for the effect of the invention (one might provide for individual links in the manner of an engine chain, but one might for example also apply rubber or plastics carrying straps with apertures for the rods, or double straps interconnected between successive rods clamped in between at regular intervals). The rods may be iron rods covered with a plastics layer. The spacing between the rods should be selected in dependence on the nature and size of the crop to be threshed, i.e. such that the threshed fruit, beans or grains, may pass between the rods. So when the material to be threshed is supplied by means of conveyor belt 15 in the direction of arrow P15 and reaches the beginning of belt 3 at the location of the extreme roller 16, this material will be threshed in the area between the rollers 10 and 13 by rubbing between belts 2 and 3. The fruit and the smaller offal portions will for a good deal fall through rods 14 of belt 3 already in the area between guide rollers 6 and 7, and for the rest perhaps also in the area higher than the uppermost guide roller 7. Similarly this material will fall thorugh rods 14 in the lower half of loop 3, the more coarse offal falling down from the belt at the end near the end roller 5 of belt 3.

In the illustrated embodiment the top belt 2 has been represented as an ordinary closed belt, i.e. consisting of massive rubber. Ii is als possible, however, to realise the top belt 2 as a rod belt similarly to the bottom belt, by which a still better rubbing action will be obtained than when a closed belt is cooperating with a rod belt.

The threshed material and the small offal, which together fall through the bottom belt 3, arrive at a closed conveyor belt 17 which is guided over two end rollers 18,19 at least one of which is driven, such that the belt is moving in the direction of arrow P17. The inclination of belt 7 and this belt's speed are selected such that the fruit arriving upon it, which naturally are relatively heavy, will roll down against the belt's movement and will fall off the belt at the end near the roller 19, whilst the offal material which naturally is light, will be taken along upwardly by the belt and will then fall down at the end past roller 18. The end roller 18 is adjustable as indicated by the arrow P18, so actually along an arc of a circle around the axis of rotation of end roller 19, by which the inclination of belt 17 may be varied in order to obtain a maximum effect in dependence on the nature and condition such as humidity of the material to be threshed. The inclination is essential to belt 17 in view of its function: separating fruit and offal components. The fact that the inclination of the main direction of the threshing belts 2 and 3 has been made equal to the inclination of belt 17 is not essential in order to be able to fulfill the threshing function, and neither is it for having the two rod belts function, i.e. simultaneously rubbing and letting fruit pass. The belts 2 and 3, however, will get a run more or less parallel to belt 17 when one starts from the fact that the position of rollers 19 and 4 with respect to belt P15 is substantially determined functionally.

The fruit falling from belt 17 arrive at a short, horizontal conveyor belt 20 which is guided over two rollers 21,22 and is driven thereby in the direction of arrow P20. When subsequently the fruit fall from this belt past the end roller 22 they can disappear through an aperture 23, where either they are discharged by another conveyor belt or they are collected in bags or cases. Just below the end roller 22 is the end of a tube 24, connected to a blower not represented, and through which an air-stream, indicated by arrow P24, is blown laterally or eventually somewhat obliquely upwardly through the falling fruit. This air serves to blow away light particles of offal material which have come down together with the fruit. The air-stream P24 flows against a flap 25 standing slantingly upwardly and which is pivotable around a pivot axis 26 as indicated by arrow P25. The angle of inclination of flap 25 can be adjusted such that a separation is established between fruit purified from offal material through aperture 23 and the offal material which for a small part is taken along by the stream P24 over the edge of flap P25 and which for the rest falls from belt 27 at end roller 23 and also from the lower threshing belt 3 at end roller 5. Thereupon the offal can disappear behind flap 25 through an aperture in the housing, according to arrow P27 and according to arrow P28.

It is remarked that a threshing machine according to this invention can also be realised with more than two threshing belts, for example with a third belt, which is provided between the two belts provided in the above described embodiment, in the event in combination with mutually different speeds.

With the machine of the invention, in which immediately during the rub-threshing itself a purification of the threshed produce by sieving is realised, a high threshing capacity is obtained as compared with the prior art rub-threshing machine which operated only with closed belts and a separate sieving apparatus which was arranged there-behind. Moreover the structure in its entirety has now also been simplified as compared with the embodiment containing a separate sieving section.

The embodiment disclosed has been represented and described only schematically. It is believed that with respect to all details—such as the structure of belt supporting rollers, the driving mechanism for some of these, tensioning means and the adjustment of belt inclination, the provision of conveyor belts etc.—the man skilled in the art of constructing agricultural machines will have no problems in the realization, because all these details are widely used for similar purposes. The essential idea of this invention—rub-threshing by means of one or two belts composed of rods—can be implemented in numerous ways so that the invention is not limited to one specific embodiment of the structure of a belt composed of interconnected spaced apart rods.

What is claimed is:

1. Rub-threshing machine for threshing grains and pulse comprising at least two endless belts which have been passed in loop-shape around guiding- and driving rollers, are driven at different speeds and are in mutual contact over a part of their surface length so as to thresh material at that location which is supplied to the belts, wherein at least the lower threshing belt is constructed of rod shaped elements, transverse with respect to the belt's direction of travel, and interconnected at their ends in such manner that the rods obtain a mutual spacing which is selected, according to the nature and fruit size of each sort of crop to be processed, such that the fruit can fall through the rods.

2. The threshing machine of claim 1, wherein below the threshing belts a closed conveyor belt is arranged for discharging the material falling through the bottom rod belt.

3. The threshing machine according to claim 2, wherein the said closed conveyor belt is arranged under an angle between 10° and 50° relative to the horizontal, and wherein the inclination and the speed of travel of this belt can be selected and adjusted such that fruit substantially roll down along the inclination of the belt and that offal material is taken along upwardly.

4. The threshing machine of claim 1 wherein the upper threshing belt is resiliently biased along at least a part of its length where it faces the lower belt.

5. Rub-threshing machine for threshing grains and pulse comprising at least two endless belts which have been passed in loop-shape around guiding- and driving rollers, are driven at different speeds and are in mutual contact over a part of their surface length so as to thresh material at that location which is supplied to the belts wherein the threshing belts are constructed, of rod shaped elements, transverse with respect to the belt's direction of travel and interconnected at their ends in such manner that the rods obtain a mutual spacing which is selected for the lower belt according to the nature and fruit size of each sort of crop to be processed, such that the fruit can fall through the rods.

6. The threshing machine of claim 5, wherein below the threshing belts a closed conveyor belt is arranged for discharging the material falling through the bottom rod belt.

7. The threshing machine of claim 6, wherein the said closed conveyor belt is arranged under an angle between 10° and 50° relative to the horizontal, and wherein the inclination and the speed of travel of this belt can be selected and adjusted such that fruit substantially roll down along the inclination of the belt and that offal material is taken along upwardly.

8. The threshing machine of claim 5 wherein the upper threshing belt is resiliently biased along at least a part of its length where it faces the lower belt.

9. Threshing machine for threshing grains and pulse comprising at least two endless belts which have been passed in loop-shape around guiding- and driving rollers, are driven at different speeds and are in mutual contact over a part of their surface length so as to thresh material at that location which is supplied to the belts, wherein at least the lower threshing belt is constructed of rod shaped elements, transverse with respect to the belt's direction of travel, and interconnected at their ends in such manner that the rods obtain a mutual spacing which is selected, according to the nature and fruit size of each sort of crop to be processed such that the fruit can fall through the rods, below the threshing belts a closed conveyor belt being arranged for discharging the material falling through the bottom rod belt, and below the lower end of the closed belt a horizontal conveyor belt being arranged for catching the material which rolls down.

10. The threshing machine of claim 1 or claim 5 wherein an airblower conduit is provided substantially laterally to the stream of downfalling fruit in view of removing affal.

11. The threshing machine of claim 10, wherein discharge apertures for the offal material are provided below and behind the extreme ends of the closed conveyor belt and the bottom threshing belt, respectively.

12. The threshing machine of claim 9 wherein the upper threshing belt is resiliently biased along at least a part of its length where it faces the lower belt.

* * * * *